US012809618B2

(12) United States Patent
Zhang et al.

(10) Patent No.: US 12,809,618 B2
(45) Date of Patent: Nov. 24, 2026

(54) VIRTUAL MACHINE HOT-UPGRADING METHOD AND APPARATUS, DEVICE, AND STORAGE MEDIUM

(71) Applicant: Beijing Bytedance Network Technology Co., Ltd., Beijing (CN)

(72) Inventors: Yang Zhang, Beijing (CN); Zhimin Feng, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 465 days.

(21) Appl. No.: 18/288,770

(22) PCT Filed: May 26, 2022

(86) PCT No.: PCT/CN2022/095301
§ 371 (c)(1),
(2) Date: Oct. 27, 2023

(87) PCT Pub. No.: WO2023/000817
PCT Pub. Date: Jan. 26, 2023

(65) Prior Publication Data

US 2024/0220235 A1 Jul. 4, 2024

(30) Foreign Application Priority Data

Jul. 20, 2021 (CN) ......................... 202110817263.1

(51) Int. Cl.
*G06F 8/656* (2018.01)
*G06F 9/455* (2018.01)

(52) U.S. Cl.
CPC .......... *G06F 8/656* (2018.02); *G06F 9/45558* (2013.01); *G06F 2009/45562* (2013.01); *G06F 2009/45575* (2013.01)

(58) Field of Classification Search
CPC ................. G06F 8/656; G06F 9/45558; G06F 2009/45562; G06F 2009/45575; G06F 8/65; G06F 9/455
See application file for complete search history.

(56) References Cited

U.S. PATENT DOCUMENTS 9,588,976 B1 * 3/2017 Riel ..................... G06F 3/0643
2012/0198431 A1 8/2012 Lin
(Continued)

FOREIGN PATENT DOCUMENTS

CN 107844304 A 3/2018
CN 109597631 A 4/2019
(Continued)

OTHER PUBLICATIONS

Office Action in CN202110817263.1, mailed Oct. 31, 2023, 7 pages.
(Continued)

*Primary Examiner* — Jorge A Chu Joy-Davila
(74) *Attorney, Agent, or Firm* — Astute IP Law Group

(57) ABSTRACT

The specification provides a method that comprises: for a virtual machine to be upgraded, creating a target virtual machine; separately switching a first interrupt descriptor structure of the virtual machine to be upgraded and a second interrupt descriptor structure of the target virtual machine from a kernel state to a user state; and causing the interrupt descriptor structure address of the second interrupt descriptor structure to point to the interrupt descriptor structure address of the first interrupt descriptor structure, so that the target virtual machine inherits interrupt descriptor information of the virtual machine to be upgraded, so as to achieve the hot upgrade of the virtual machine to be upgraded. The problems of interruption loss and invalid interruption injec-
(Continued)

tion during the hot upgrade of the virtual machine can be effectively avoided, the waste of resources can also be reduced.

20 Claims, 5 Drawing Sheets

(56) References Cited

U.S. PATENT DOCUMENTS

| | | | | |
|---|---|---|---|---|
| 2015/0106810 | A1 | 4/2015 | Ciano et al. | |
| 2016/0306649 | A1* | 10/2016 | Gunti | G06F 9/4406 |
| 2018/0203715 | A1 | 7/2018 | Granado | |
| 2020/0167176 | A1 | 5/2020 | Arroyo et al. | |
| 2020/0401392 | A1* | 12/2020 | Yuan | G06F 9/44521 |
| 2021/0157624 | A1* | 5/2021 | Saxena | G06F 9/4856 |
| 2022/0012036 | A1* | 1/2022 | Shah | G06F 8/61 |

FOREIGN PATENT DOCUMENTS

| | | | |
|---|---|---|---|
| CN | 110968392 | A | 4/2020 |
| CN | 111552489 | A | 8/2020 |
| CN | 112805693 | A | 5/2021 |
| CN | 113535215 | A | 10/2021 |
| TW | 201734822 | A | 10/2017 |
| WO | 2020079388 | A1 | 4/2020 |

OTHER PUBLICATIONS

International Search Report in PCT/CN2022/095301, mailed Aug. 2, 2022, 4 pages.

* cited by examiner

VIRTUAL MACHINE HOT-UPGRADING METHOD AND APPARATUS, DEVICE, AND STORAGE MEDIUM

CROSS REFERENCE TO RELATED APPLICATIONS

The present application is a national stage application filed under 35 U.S.C. 371 based on International Patent Application No. PCT/CN2022/095301, filed on May 26, 2022, which claims priority of the Chinese invention patent application with the application No. 202110817263.1, entitled "VIRTUAL MACHINE HOT-UPGRADING METHOD AND APPARATUS, DEVICE, AND STORAGE MEDIUM" and field on Jul. 20, 2021, the disclosures of which are incorporated herein by reference in their entities.

FIELD

The present disclosure relates to the field of interactive technology, and more specifically, to a virtual machine hot-upgrading method, apparatus, device and storage medium.

BACKGROUND

In the computer field, resource allocation is often optimized by simulating multiple virtual machines in a host. In order to repair virtual machine vulnerabilities and add virtual machine functions, the virtual machine needs to be hot upgraded.

In related virtual machine hot-upgrading technology, the technical problem of lost interrupts during the virtual machine hot-upgrading process will be solved by reissuing virtual interrupts. However, the method will cause the injection of invalid interrupts, occupy a lot of memory and processor resources, and consume a lot of time. Therefore, how to ensure that interrupts are not lost during hot upgrade and avoid the injection of invalid interrupts has become an urgent problem to be solved.

SUMMARY

Embodiments of the present disclosure provide at least a virtual machine hot-upgrading method, apparatus, device, and storage medium.

Embodiments of the present disclosure provide a virtual machine hot-upgrading method, comprising:

For a virtual machine to be upgraded, creating a target virtual machine;

Separately switching a first interrupt descriptor structure of the virtual machine to be upgraded and a second interrupt descriptor structure of the target virtual machine from a kernel state to a user state;

Causing the interrupt descriptor structure address of the second interrupt descriptor structure to point to the interrupt descriptor structure address of the first interrupt descriptor structure, so that the target virtual machine inherits interrupt descriptor information of the virtual machine to be upgraded; and Running the target virtual machine according to a task process in the virtual machine to be upgraded to implement hot upgrade of the virtual machine to be upgraded.

Embodiments of the present disclosure further provide a virtual machine hot-upgrading apparatus, comprising:

A creation module, creating a target virtual machine for the virtual machine to be upgraded;

A switching module, separately switching a first interrupt descriptor structure of the virtual machine to be upgraded and a second interrupt descriptor structure of the target virtual machine from a kernel state to a user state;

An inheritance module, causing the interrupt descriptor structure address of the second interrupt descriptor structure to point to the interrupt descriptor structure address of the first interrupt descriptor structure, so that the target virtual machine inherits interrupt descriptor information of the virtual machine to be upgraded; and An upgrade module, running the target virtual machine according to a task process in the virtual machine to be upgraded to implement hot upgrade of the virtual machine to be upgraded.

Embodiments of the present disclosure further provide an electronic device, comprising: a processor, a memory storing executable machine-readable instructions by the processor, and a bus; when the electronic device is running, the processor and the memory communicate through a bus; and when the machine-readable instructions are executed by the processor, the steps of the virtual machine hot-upgrading method are performed.

Embodiments of the present disclosure further provide a computer-readable storage medium, wherein a computer program is stored on the computer-readable storage medium, and when the computer program is run by a processor, the steps of the virtual machine hot-upgrading method are executed.

Embodiments of the present disclosure provides a virtual machine hot-upgrading method and apparatus, a device, and a storage medium. The method comprises: for a virtual machine to be upgraded, creating a target virtual machine; separately switching a first interrupt descriptor structure of the virtual machine to be upgraded and a second interrupt descriptor structure of the target virtual machine from a kernel state to a user state; causing the interrupt descriptor structure address of the second interrupt descriptor structure to point to the interrupt descriptor structure address of the first interrupt descriptor structure, so that the target virtual machine inherits interrupt descriptor information of the virtual machine to be upgraded; so as to achieve the hot upgrade of the virtual machine to be upgraded; and running the target virtual machine according to a task process in the virtual machine to be upgraded to implement hot upgrade of the virtual machine to be upgraded.

In this way, the interrupt descriptor structure address of the second interrupt descriptor structure is caused to point to the interrupt descriptor structure address of the first interrupt descriptor structure, so that the target virtual machine inherits interrupt descriptor information of the virtual machine to be upgraded, so as to achieve the hot upgrade of the virtual machine to be upgraded. The problems of interruption loss and invalid interruption injection during the hot upgrade of the virtual machine can be effectively avoided, the waste of resources can also be reduced, and the improvement of the hot-upgrading efficiency of the virtual machine is facilitated.

In order to make the above objects, features and advantages of the present disclosure more obvious and understandable, preferred embodiments are given below and described in detail with reference to the Drawings.

BRIEF DESCRIPTION OF THE DRAWINGS

In order to more clearly explain the embodiments of the present disclosure or the technical solutions in the prior art, the following will briefly introduce the drawings needed to describe the embodiments. The Drawings, which are incorporated in and constitute a part of this Description, illustrate embodiments consistent with the disclosure and together with the Description, serve to explain the principles of the disclosure. It is to be understood that the following drawings illustrate only certain embodiments of the disclosure and, therefore, are not to be considered limiting of scope. For those skilled in the art, other relevant drawings can also be obtained based on these drawings without exerting creative efforts.

DETAILED DESCRIPTION OF EMBODIMENTS

Figure 1:
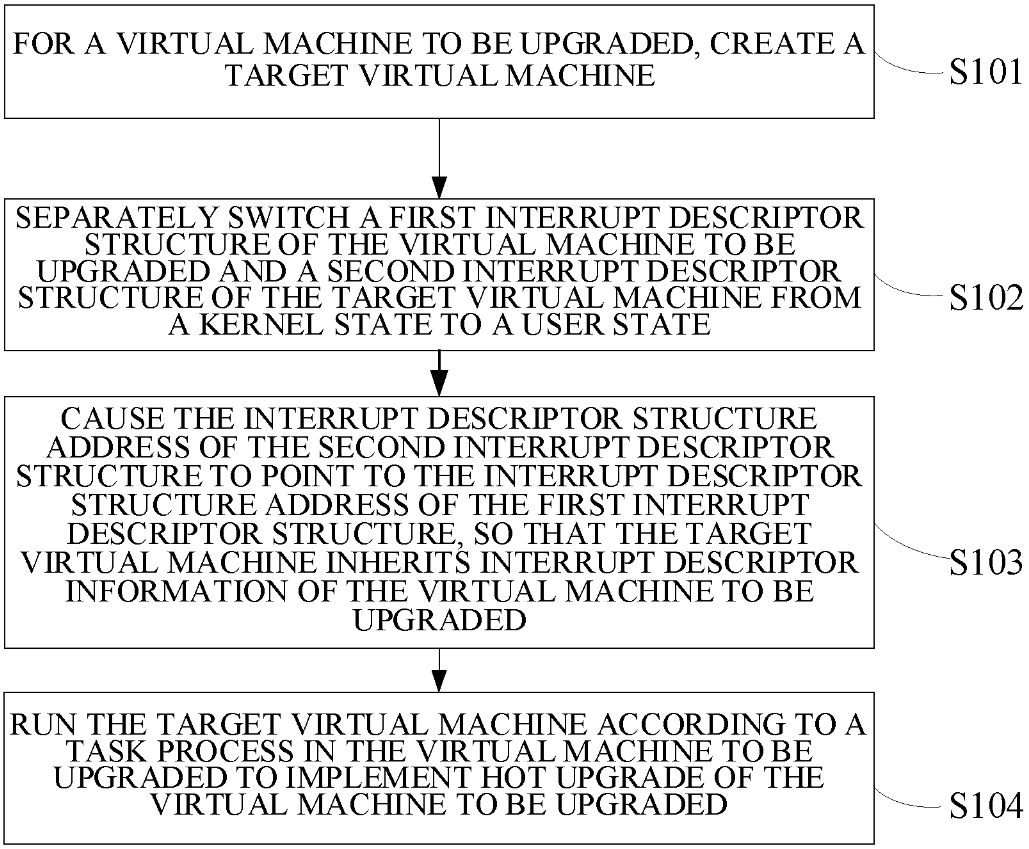
FIG. 1 is a flow chart of a virtual machine hot-upgrading method provided by an embodiment of the present disclosure.

In order to make the purposes, technical solutions and advantages of the embodiments of the present disclosure more clear, the technical solutions in the embodiments of the present disclosure will be clearly and completely described below with reference to the drawings in the embodiments of the present disclosure. Obviously, the described embodiments are only some of the embodiments of the present disclosure, but not all of the embodiments. The components of the embodiments of the present disclosure generally described and illustrated in the drawings herein may be arranged and designed in a variety of different configurations. Therefore, the following detailed description of the embodiments of the disclosure provided in the drawings is not intended to limit the scope of the claimed disclosure, but rather to represent selected embodiments of the disclosure. Based on the embodiments of the present disclosure, all other embodiments obtained by those skilled in the art without any creative efforts shall fall within the scope of protection of the present disclosure.

It should be noted that similar reference numerals and letters represent similar items in the following figures, therefore, once an item is defined in one figure, it does not need further definition and explanation in subsequent figures.

The term "and/or" in this article only describes an association relationship, indicating that three relationships can exist. For example, A and/or B can mean: A exists alone, A and B exist simultaneously, and B exists alone. In addition, the term "at least one" herein means any one of a plurality or any combination of at least two of a plurality. For example, including at least one of A, B, and C may mean including any one or more elements selected from the set consisting of A, B, and C.

Research has found that in related virtual machine hot-upgrading technology, the technical problem of interrupt loss will be solved through virtual machine hot migration and reissuance of virtual interrupts. These two methods will cause the injection of invalid interrupts, occupy a lot of memory and processor resources, and cause technical problems that consume a lot of time. Therefore, how to ensure that interrupts are not lost during hot upgrade and avoid the injection of invalid interrupts has become an urgent problem to be solved.

Based on the above research, this disclosure provides a virtual machine hot-upgrading method, wherein the interrupt descriptor structure address of the second interrupt descriptor structure is caused to point to the interrupt descriptor structure address of the first interrupt descriptor structure, so that the target virtual machine inherits interrupt descriptor information of the virtual machine to be upgraded, so as to achieve the hot upgrade of the virtual machine to be upgraded. The problems of interruption loss and invalid interruption injection during the hot upgrade of the virtual machine can be effectively avoided, the waste of resources can also be reduced, and the improvement of the hot-upgrading efficiency of the virtual machine is facilitated.

Further, by prohibiting a clearing operation of the contents in the second interrupt descriptor structure during the process of initializing the target virtual machine, interrupt loss during the hot upgrade of the virtual machine is prevented, and the work efficiency of the virtual machine is ensured.

Further, through a fork function and an execution function, a task process in the virtual machine to be upgraded is called to the started target virtual machine for execution, so as to ensure the consistency of the task process of the target virtual machine and the task process of the virtual machine to be upgraded, thereby ensuring the work efficiency of the virtual machine when performing hot upgrade.

In order to facilitate understanding of the embodiment, a virtual machine hot-upgrading method disclosed in the embodiment of the present disclosure is first introduced in detail. The execution subject of the virtual machine hot-upgrading method provided by the embodiment of the present disclosure is generally a computer device with certain computing capabilities. The computer device includes, for example: a terminal device, a server or other processing device. The terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device, a Virtual Reality (VR) device, an Augmented Reality (AR) device, etc. In some possible implementations, the virtual machine hot-upgrading method can be implemented by the processor calling computer-readable instructions stored in the memory.

Referring to FIG. 1, FIG. 1 is a flow chart of a virtual machine hot-upgrading method provided by an embodiment of the present disclosure.

As shown in FIG. 1, the virtual machine hot-upgrading method provided by an embodiment of the present disclosure comprises:

S101: for a virtual machine to be upgraded, creating a target virtual machine.

In practical applications, virtual machine hot upgrade needs to be able to upgrade the virtual machine without interrupting the ongoing business. In order to ensure that interrupts are not lost during the hot-upgrading process and to avoid the injection of invalid interrupts, the above problem can be solved by creating another virtual machine to inherit the interrupt information of the virtual machine to be upgraded.

In this step, a target virtual machine can be created on the same host based on the virtual machine to be upgraded.

Specifically, upgrades on a virtual machine are mostly due to system vulnerabilities, lower system versions, and at least some backward configurations of the relevant virtual machines. Therefore, the virtual machine needs to be upgraded to meet the requirements of repairing the virtual machine system, updating the system, and upgrading the configuration. Accordingly, when the virtual machine to be upgraded is hot upgraded, the target virtual machine can be created correspondingly through the upgrade information of the virtual machine to be upgraded, wherein the upgrade information may include system vulnerability repair information and system update information for the virtual machine to be upgraded.

S102: separately switching a first interrupt descriptor structure of the virtual machine to be upgraded and a second interrupt descriptor structure of the target virtual machine from a kernel state to a user state.

Figure 2:
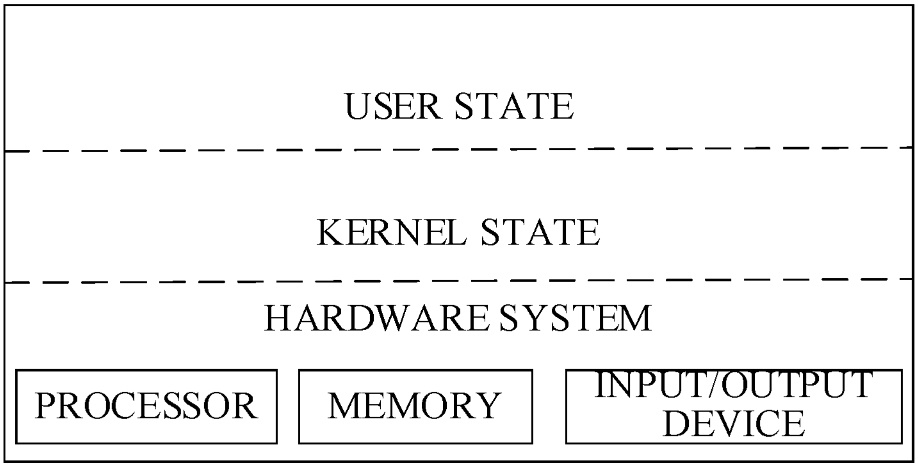
FIG. 2 is a schematic diagram of the user state and kernel state of an operating system provided by an embodiment of the present disclosure.

Referring to FIG. 2, FIG. 2 is a schematic diagram of the user state and kernel state of an operating system. As shown in FIG. 2, the operating system will classify execution permissions into user mode and kernel mode, wherein the user mode has lower execution permissions and is used to provide a space for application running. The kernel mode is mainly used to control the computer's hardware resources, such as executing CPU instructions, referencing any address memory, and providing an environment for application running.

Therefore, in this step, after creating the target virtual machine based on the hot-upgrading information of the virtual machine to be upgraded, in order to be able to read the first interrupt descriptor structure of the virtual machine to be upgraded and the second interrupt descriptor structure of the target virtual machine, it is required to switch the first interrupt descriptor structure of the virtual machine to be upgraded and the second interrupt descriptor structure of the target virtual machine from the kernel state to the user state respectively.

Therein, the interrupt descriptor structure is allocated during the virtual machine initialization process.

S103: causing the interrupt descriptor structure address of the second interrupt descriptor structure to point to the interrupt descriptor structure address of the first interrupt descriptor structure, so that the target virtual machine inherits its interrupt descriptor information of the virtual machine to be upgraded.

In this step, after switching the first interrupt descriptor structure of the virtual machine to be upgraded and the second interrupt descriptor structure of the target virtual machine from the kernel mode to the user mode respectively, in order to make the interrupt descriptor information of the target virtual machine during the virtual machine hot-upgrading process consistent with the interrupt descriptor information of the virtual machine to be upgraded, the interrupt descriptor structure address of the second interrupt descriptor structure may be pointed to the interrupt descriptor structure address of the first interrupt descriptor structure. In this way, the interrupt descriptor structure address of the second interrupt descriptor structure is consistent with the interrupt descriptor structure address of the first interrupt descriptor structure and share the same address, so that the target virtual machine inherits the interrupt descriptor information of the virtual machine to be upgraded.

S104: running the target virtual machine according to a task process in the virtual machine to be upgraded to implement hot upgrade of the virtual machine to be upgraded.

In this step, the virtual machine to be upgraded is run according to the task process in the virtual machine to be upgraded. When an interrupt arrives, the virtual machine to be upgraded stores the interrupt information into the interrupt descriptor structure address of the first interrupt descriptor structure. Since the target virtual machine and the virtual machine to be upgraded have the same interrupt descriptor structure address, the target virtual machine can execute the interrupt through the same interrupt descriptor structure address, and at the same time realize hot upgrade of the virtual machine to be upgraded.

Figure 3:
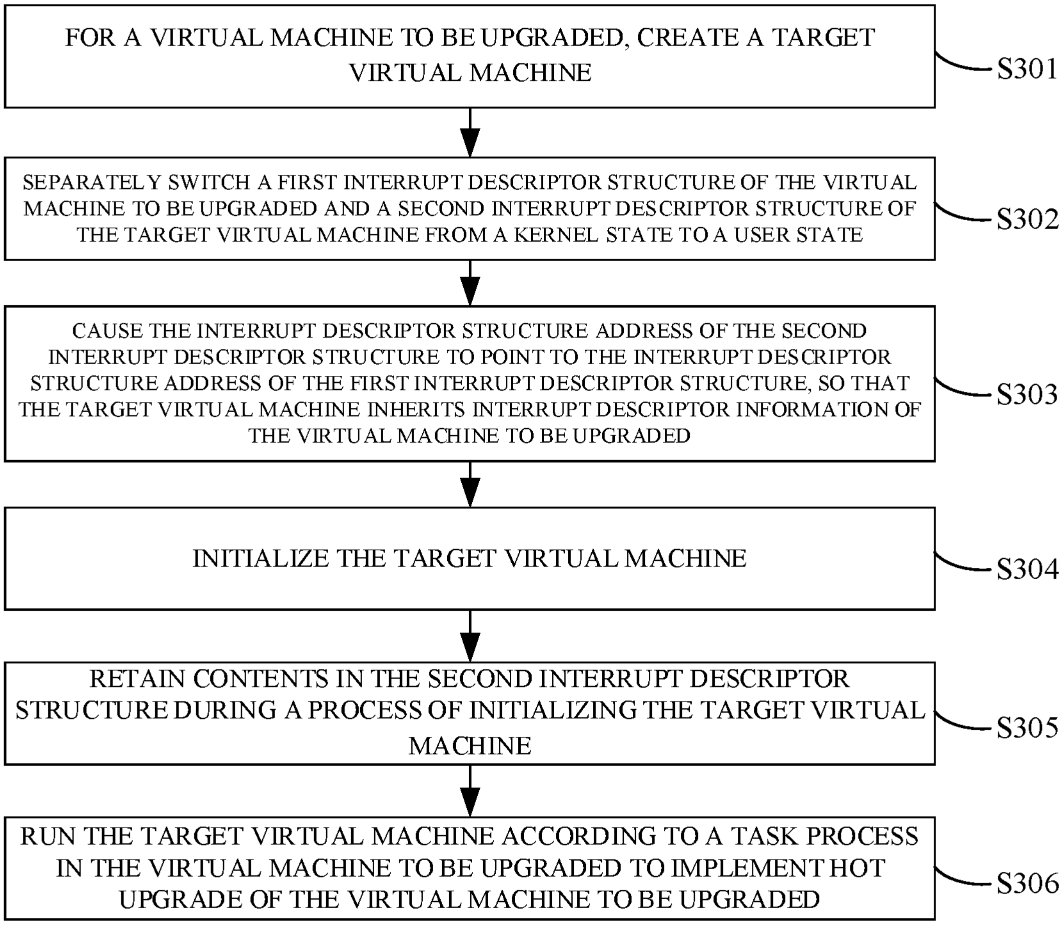
FIG. 3 is a flow chart of another virtual machine hot-upgrading method provided by an embodiment of the present disclosure.

Referring to FIG. 3, FIG. 3 is a flow chart of another virtual machine hot-upgrading method provided by an embodiment of the present disclosure. As shown in FIG. 3, another virtual machine hot-upgrading method provided by an embodiment of the present disclosure comprises:

S301: for a virtual machine to be upgraded, creating a target virtual machine.

S302: separately switching a first interrupt descriptor structure of the virtual machine to be upgraded and a second interrupt descriptor structure of the target virtual machine from a kernel state to a user state.

S303: causing the interrupt descriptor structure address of the second interrupt descriptor structure to point to the interrupt descriptor structure address of the first interrupt descriptor structure, so that the target virtual machine inherits its interrupt descriptor information of the virtual machine to be upgraded.

S304: initializing the target virtual machine.

In this step, after the target virtual machine inherits the interrupt descriptor information of the virtual machine to be upgraded, the target virtual machine can be initialized according to the interrupt descriptor information inherited by the target virtual machine.

S305: retaining contents in the second interrupt descriptor structure during a process of initializing the target virtual machine.

In this step, during the process of initializing the target virtual machine, the kernel module in the target virtual machine clears the contents of the interrupt descriptor structure of the target virtual machine. During the hot-upgrading process, if the virtual machine to be upgraded has written interrupt information into the interrupt descriptor structure, but has not yet synchronized it to the control structure of the virtual machine to be upgraded, at this time, the target virtual machine will clear the contents of the interrupt descriptor structure, which will cause the interrupt information that has been written in the virtual machine to be upgraded to be lost. Therefore, during the process of initializing the target virtual machine, the contents in the second interrupt descriptor structure are retained.

S306: running the target virtual machine according to a task process in the virtual machine to be upgraded to implement hot upgrade of the virtual machine to be upgraded Therein, for the description of step S301, step S302, step S303 and step S306, reference can be made to the description of step S101 to step S104, and the same technical effect can be achieved and the same technical problem can be solved, so no further description is given here.

Next, the embodiment will be further described with reference to specific implementation modes.

In an optional embodiment, the method further comprises:

Configuring an interrupt descriptor structure address for the created second interrupt descriptor structure of the target virtual machine according to a memory page requested from a memory pool.

Since after creating a virtual machine, in order to make the created virtual machine usable, the parameters of the created virtual machine need to be configured, a memory page may be applied for from the memory pool, and the applied memory page can be used as the interrupt descriptor structure address of the second interrupt descriptor structure of the target virtual machine to obtain the configured target virtual machine.

Therein, when the memory pool performs virtual memory management for the operating system, it saves the amount of memory occupied by the page table and helps improve system performance.

In an optional embodiment, step 303 comprises:

Using an interrupt descriptor structure address of the first interrupt descriptor structure to replace the interrupt descriptor structure address of the second interrupt descriptor structure, so that the target virtual machine inherits the interrupt descriptor information of the virtual machine to be upgraded.

In this step, after obtaining the interrupt descriptor structure address of the first interrupt descriptor structure of the virtual machine to be upgraded and the interrupt descriptor structure address of the second interrupt descriptor structure of the target virtual machine, the target virtual machine is caused to inherit the interrupt descriptor information of the virtual machine to be upgraded through a method in which an interrupt descriptor structure address of the second interrupt descriptor structure is replaced by an interrupt descriptor structure address of the first interrupt descriptor structure.

In an optional embodiment, step 304 further comprises:

Prohibiting to update the interrupt remapping table entry of the target virtual machine during the process of initializing the target virtual machine.

In this step, during the process of initializing the target virtual machine, the kernel module of the target virtual machine will establish an Interrupt Remapping Table Entry (IRTE) for the client. During the virtual machine hot-upgrading process, the interrupt descriptor structure address and interrupt vector information used by the target virtual machine and the virtual machine to be upgraded are consistent. Therefore, during the process of initializing the target virtual machine, it is prohibited to update the interrupt remapping table entry of the target virtual machine.

In an optional embodiment, step 304 further comprises:

Retaining an interrupt request data in the interrupt descriptor structure of the target virtual machine during the process of initializing the target virtual machine.

In this step, when initializing the target virtual machine, the target virtual machine kernel module is called through the device control interface function (Ioctl) in the device driver in the system call function to obtain the Advanced Programmable Interrupt Controller (APIC) data. During this process, the target virtual machine synchronizes the posted interrupt request content in the interrupt descriptor structure to the posted interrupt request register by calling the vmx_sync_pir_to_irr function. At the same time, the Posted Interrupt Request (PIR) data in the interrupt descriptor structure is cleared. If the hot upgrade fails, the interrupt request data in the interrupt descriptor structure of the target virtual machine will be lost, which will affect the normal interrupt injection of the virtual machine to be upgraded. Therefore, during the process of initializing the target virtual machine, the interrupt request data in the interrupt descriptor structure of the target virtual machine needs to be retained.

In an optional embodiment, step 305 comprises:

Calling the task process in the virtual machine to be upgraded to the started target virtual machine for execution through a fork function and an execution function, so as to start the target virtual machine to implement hot upgrade of the virtual machine to be upgraded.

In this step, the fork function and execution function can ensure that the task process in the target virtual machine is consistent with the task process in the virtual machine to be upgraded and runs independently of each other, so that the target virtual machine to perform services of the virtual machine is upgraded during the hot-upgrading process of the virtual machine to be upgraded.

Figure 4:
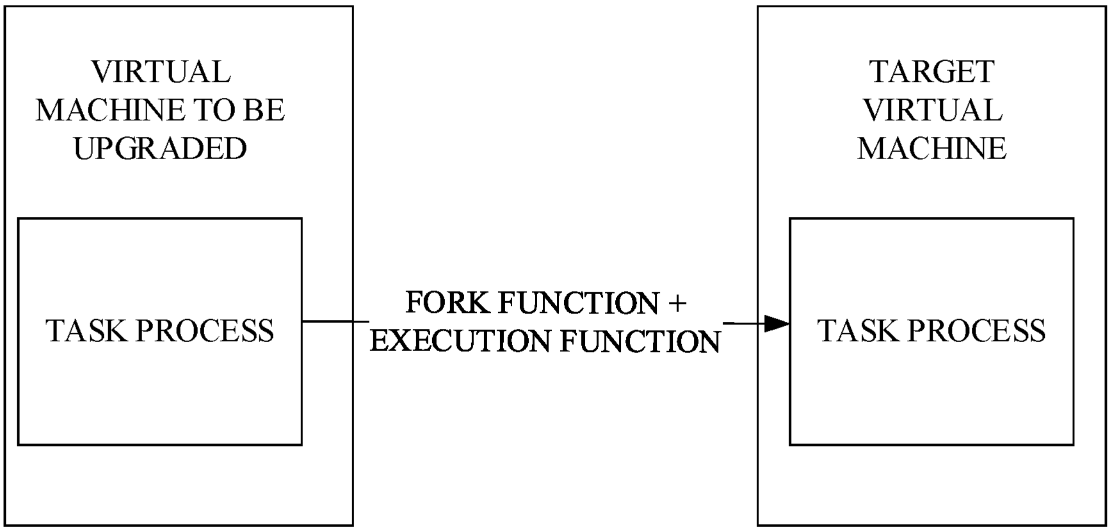
FIG. 4 is a schematic diagram of starting a task process in the target virtual machine provided by an embodiment of the present disclosure.

For example, referring to FIG. 4, FIG. 4 is a schematic diagram of starting a task process in the target virtual machine. As shown in FIG. 4, using the fork function in the task process in the virtual machine to be upgraded can create a task process in the target virtual machine. And the task process in the target virtual machine uses the same code segment as the task process in the virtual machine to be upgraded, and copies the stack segment and data segment of the task process in the virtual machine to be upgraded. After the task process in the target virtual machine starts running, the two no longer affect each other.

In addition, during the virtual machine hot-upgrading process, if the task process in the virtual machine to be upgraded needs to continue running when the task process in the virtual machine to be upgraded starts the task process in the target virtual machine, the process is realized by combining the fork function and the execution function in the task process in the virtual machine to be upgraded.

The virtual machine hot-upgrading method provided by the embodiment of the present disclosure comprises causing the interrupt descriptor structure address of the second interrupt descriptor structure to point to the interrupt descriptor structure address of the first interrupt descriptor structure, so that the target virtual machine inherits interrupt descriptor information of the virtual machine to be upgraded; initializing the target virtual machine according to the interrupt descriptor information inherited by the target virtual machine; retaining contents in the second interrupt descriptor structure during a process of initializing the target virtual machine; and starting the task process in the target virtual machine from the task process in the virtual machine to be upgraded, so as to the consistency of the task process of the target virtual machine and the task process of the virtual machine to be upgraded, thus the hot upgrade of the virtual machine to be upgraded is realized. The virtual machine hot-upgrading method can not only ensure the consistency of the task process of the target virtual machine and the task process of the virtual machine to be upgraded, but also effectively avoid the problems of interrupt loss and invalid interrupt injection during the hot upgrade of the virtual machine, reduce resource waste, and help improve the efficiency of the virtual machine when performing hot upgrade.

Those skilled in the art can understand that in the above methods of embodiments, the writing order of each step does not imply a strict execution order and does not constitute any limitation on the implementation process. The specific execution sequence of each step should be determined by its function and possible internal logic.

Based on the same inventive concept, the embodiment of the present disclosure also provides a virtual machine hot-upgrading apparatus corresponding to the virtual machine hot-upgrading method. Since the problem-solving principle of the device in the embodiment of the present disclosure is similar to the virtual machine hot-upgrading method described above in the embodiment of the present disclosure, the implementation of the apparatus can be referred to the implementation of the method, and repeated details will not be described again.

Figure 5:
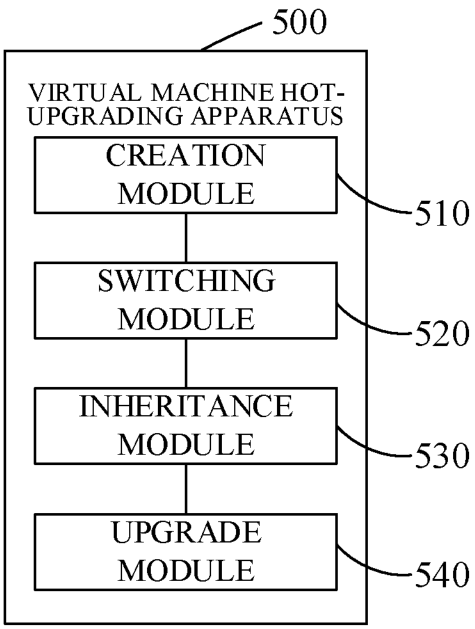
FIG. 5 is one of the structural diagrams of a virtual machine hot-upgrading apparatus provided by an embodiment of the present disclosure.
Figure 6:
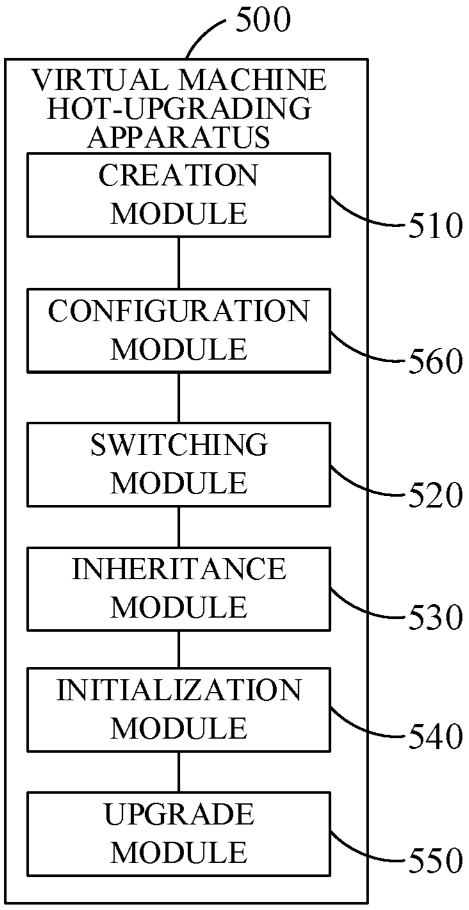
FIG. 6 is a second structural diagram of a virtual machine hot-upgrading apparatus provided by an embodiment of the present disclosure.

Referring to FIG. 5 to FIG. 6, FIG. 5 is one of the structural diagrams of a virtual machine hot-upgrading apparatus provided by an embodiment of the present disclosure, and FIG. 6 is a second structural diagram of a virtual machine hot-upgrading apparatus provided by an embodiment of the present disclosure.

As shown in FIG. 5. A virtual machine hot-upgrading apparatus 500 provided by the embodiment of the present disclosure, comprises:

A creation module 510, creating a target virtual machine for the virtual machine to be upgraded;

A switching module 520, separately switching a first interrupt descriptor structure of the virtual machine to be upgraded and a second interrupt descriptor structure of the target virtual machine from a kernel state to a user state;

An inheritance module 530, causing the interrupt descriptor structure address of the second interrupt descriptor structure to point to the interrupt descriptor structure address of the first interrupt descriptor structure, so that the target virtual machine inherits interrupt descriptor information of the virtual machine to be upgraded; and An upgrade module 540, running the target virtual machine according to a task process in the virtual machine to be upgraded to implement hot upgrade of the virtual machine to be upgraded.

In an optional embodiment, the inheritance module 520 is specifically used for:

Using an interrupt descriptor structure address of the first interrupt descriptor structure to replace the interrupt descriptor structure address of the second interrupt descriptor structure, so that the target virtual machine inherits the interrupt descriptor information of the virtual machine to be upgraded.

In an optional embodiment, the upgrade module 540 is specifically used for:

Calling the task process in the virtual machine to be upgraded to the started target virtual machine for execution through a fork function and an execution function, so as to start the target virtual machine to implement hot upgrade of the virtual machine to be upgraded.

In an optional embodiment, as shown in FIG. 6, the virtual machine hot-upgrading apparatus 500 further comprises an initialization module 550 and a configuration module 560, wherein the initialization module 550 is used for:

Retaining contents in the second interrupt descriptor structure during a process of initializing the target virtual machine; and wherein:

The configuration module 560 is used for:

Configuring an interrupt descriptor structure address for the created second interrupt descriptor structure of the target virtual machine according to a memory page requested from a memory pool.

In an optional embodiment, the initialization module 550 is further used for:

Prohibiting to update the interrupt remapping table entry of the target virtual machine during the process of initializing the target virtual machine.

In an optional embodiment, the initialization module 550 is further used for:

Retaining an interrupt request data in the interrupt descriptor structure of the target virtual machine during the process of initializing the target virtual machine.

The virtual machine hot-upgrading apparatus provided by the embodiment of the present disclosure may cause the interrupt descriptor structure address of the second interrupt descriptor structure to point to the interrupt descriptor structure address of the first interrupt descriptor structure, so that the target virtual machine inherits interrupt descriptor information of the virtual machine to be upgraded; initialize the target virtual machine according to the interrupt descriptor information inherited by the target virtual machine; retain contents in the second interrupt descriptor structure during a process of initializing the target virtual machine; and start the task process in the target virtual machine from the task process in the virtual machine to be upgraded, so as to the consistency of the task process of the target virtual machine and the task process of the virtual machine to be upgraded, thus the hot upgrade of the virtual machine to be upgraded is realized. The virtual machine hot-upgrading method can not only ensure the consistency of the task process of the target virtual machine and the task process of the virtual machine to be upgraded, but also effectively avoid the problems of interrupt loss and invalid interrupt injection during the hot upgrade of the virtual machine, reduce resource waste, and help improve the efficiency of the virtual machine when performing hot upgrade. For a description of the processing flow of each module in the device and the interaction flow between the modules, please refer to the relevant descriptions in the above method embodiments, and will not be described in detail here.

Figure 7:
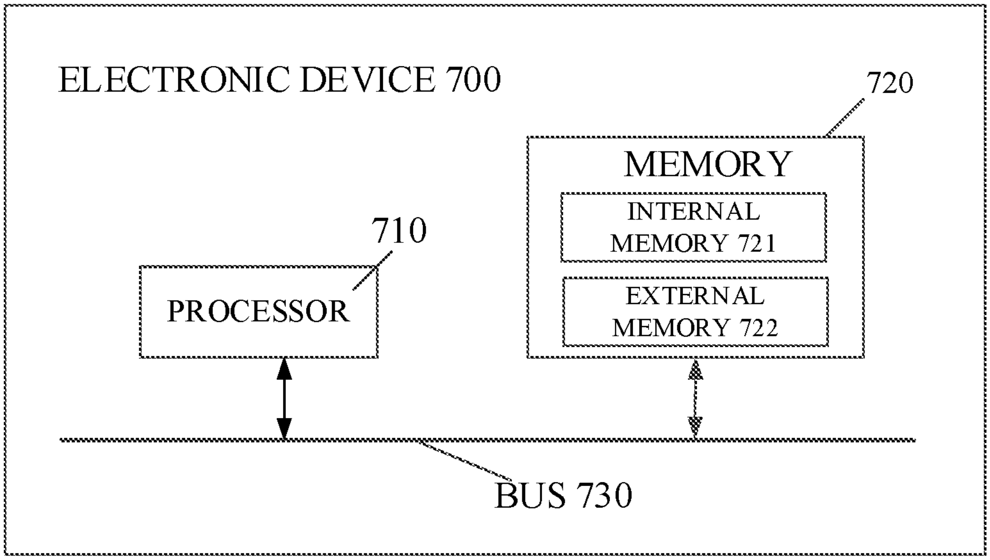
FIG. 7 shows a schematic diagram of an electronic device provided by an embodiment of the present disclosure.

Corresponding to the virtual machine hot-upgrading method in FIG. 1 and FIG. 3, the embodiment of the present disclosure also provides an electronic device. As shown in FIG. 7, which is a schematic diagram of an electronic device provided by an embodiment of the present disclosure, the electronic device comprises: a processor 710, a memory 720, and a bus 730, wherein the memory 720 is used to store execution instructions, including an internal memory 721 and an external memory 722; The internal memory 721 here is also called an internal storage used to temporarily store the operation data in the processor 710 and the data exchanged with the external memory 722 such as the hard disk; the processor 710 exchanges data with the external memory 722 through the internal memory 721; when the electronic device 700 is running, the processor 710 and the memory 720 communicate through a bus 730; so that the steps of the virtual machine hot-upgrading method as described in the above method embodiment are executed.

The embodiment of the present disclosure further provides a computer-readable storage medium, wherein a computer program is stored on the computer-readable storage medium. When the computer program is run by a processor, the steps of the virtual machine hot-upgrading method as described in the above method embodiment are executed. Therein, the storage medium may be a volatile or non-volatile computer-readable storage medium.

A computer program product of a virtual machine hot-upgrading method provided by the embodiment of the present disclosure, comprises a computer-readable storage medium storing program codes, wherein, the instructions included in the program codes may be used to execute the steps of the virtual machine hot-upgrading method described in the above method embodiment. For details, please refer to the above method embodiments, which will not be described again here.

Embodiments of the present disclosure also provide a computer program, which implements any of the methods in the above embodiments when executed by a processor. The computer program product can be implemented specifically through a hardware, a software or a combination thereof. In an optional embodiment, the computer program product is embodied as a computer storage medium. In another optional embodiment, the computer program product is embodied as a software product, such as a Software Development Kit (SDK), etc.

Those skilled in the art can clearly understand that for the convenience and simplicity of description, the specific working processes of the system and apparatus described above can be referred to the corresponding processes in the foregoing method embodiments, and will not be described again here. In the several embodiments provided by the present disclosure, it should be understood that the disclosed systems, apparatus and methods can be implemented in other ways. The apparatus embodiments described above are only illustrative. For example, the division of units is only a logical function division, and there may be other division methods during actual implementation. As another example, multiple units or components may be combined or integrated into another system, or some features may be omitted, or not performed. On the other hand, the coupling or direct coupling or communication connection between each other shown or discussed may be through some communication interfaces, and the indirect coupling or communication connection of the devices or units may be in electrical, mechanical or other forms.

The units described as separate components may or may not be physically separated, and the components shown as units may or may not be physical units. That is, it can be located in one place, or it can be distributed across multiple network units. Some or all of the units can be selected according to actual needs to achieve the purpose of the solution of the embodiment.

In addition, each functional unit in various embodiments of the present disclosure may be integrated into one processing unit, or each unit may exist physically alone, or two or more units may be integrated into one unit.

If the functions are implemented in the form of software functional units and sold or used as independent products, they can be stored in a non-volatile computer-readable storage medium that is executable by a processor.

Based on such understanding, the technical solution of the present disclosure is essentially or the part that contributes to the existing technology or the part of the technical solution can be embodied in the form of a software product. The computer software product is stored in a storage medium and includes a number of instructions to cause a computer device (which can be a personal computer, a server, or a network device, etc.) to execute all or part of the steps of the methods described in various embodiments of the present disclosure.

The above storage media include: U disk, mobile hard disk, Read-Only Memory (ROM), Random Access Memory (RAM), magnetic disk or optical disk and other media that can store program code.

Finally, it should be noted that the above embodiments are only specific implementations of the present disclosure and are used to illustrate the technical solutions of the present disclosure, but not to limit them. The protection scope of the present disclosure is not limited thereto.

Although the present disclosure has been described in detail with reference to the foregoing embodiments, those of ordinary skill in the art will understand that: any person familiar with the technical field can still make modifications or easily think of changes to the technical solutions recorded in the above embodiments within the technical scope disclosed in the present disclosure, or make equivalent substitutions for some of the technical features; These modifications, changes or substitutions do not cause the essence of the corresponding technical solutions to deviate from the spirit and scope of the technical solutions of the embodiments of the present disclosure, and they should all be covered by the protection scope of the present disclosure. Therefore, the protection scope of the present disclosure should be determined by the protection scope of the Claims.

What is claimed is:

1. A hot-upgrading method for a virtual machine, wherein comprising:

creating, in a same host as a virtual machine to be upgraded, a first virtual machine for a virtual machine to be upgraded;

separately switching a first interrupt descriptor structure of the virtual machine to be upgraded and a second interrupt descriptor structure of the first virtual machine from a kernel state to a user state;

causing an interrupt descriptor structure address of the second interrupt descriptor structure to point to an interrupt descriptor structure address of the first interrupt descriptor structure, so that the first virtual machine inherits interrupt descriptor information of the virtual machine to be upgraded; and running the first virtual machine, based on a task process in the virtual machine to be upgraded, to implement hot upgrade of the virtual machine to be upgraded.

2. The method of claim 1, wherein after creating the first virtual machine for the virtual machine to be upgraded, the method further comprises:

configuring the interrupt descriptor structure address for the created second interrupt descriptor structure of the first virtual machine based on a memory page requested from a memory pool.

3. The method of claim 1, wherein causing the interrupt descriptor structure address of the second interrupt descriptor structure to point to the interrupt descriptor structure address of the first interrupt descriptor structure, so that the first virtual machine inherits interrupt descriptor information of the virtual machine to be upgraded comprises:

using the interrupt descriptor structure address of the first interrupt descriptor structure to replace the interrupt descriptor structure address of the second interrupt descriptor structure, so that the first virtual machine inherits the interrupt descriptor information of the virtual machine to be upgraded.

4. The method of claim 1, wherein after causing the interrupt descriptor structure address of the second interrupt descriptor structure to point to the interrupt descriptor structure address of the first interrupt descriptor structure, so that the first virtual machine inherits interrupt descriptor information of the virtual machine to be upgraded, the method further comprises:

initializing the first virtual machine; and retaining contents in the second interrupt descriptor structure during a process of initializing the first virtual machine.

5. The method of claim 4, wherein the method further comprises:

prohibiting updating an interrupt remapping table entry of the first virtual machine during the process of initializing the first virtual machine.

6. The method of claim 4, wherein the method further comprises:

retaining an interrupt request data in the interrupt descriptor structure of the first virtual machine during the process of initializing the first virtual machine.

7. The method of claim 1, wherein running the first virtual machine based on a task process in the virtual machine to be upgraded to implement hot upgrade of the virtual machine to be upgraded comprises:

calling, through a fork function and an execution function, the task process in the virtual machine to be upgraded to the first virtual machine that is started for execution, so as to start the first virtual machine to implement hot upgrade of the virtual machine to be upgraded.

8. An electronic device, comprising: a processor, a memory storing machine-readable instructions executable by the processor, and a bus, wherein when the electronic device is running, the processor and the memory communicate through a bus; and when the machine-readable instructions are executed by the processor, cause the processor to:

create, in a same host as a virtual machine to be upgraded, a first virtual machine for a virtual machine to be upgraded;

separately switch a first interrupt descriptor structure of the virtual machine to be upgraded and a second interrupt descriptor structure of the first virtual machine from a kernel state to a user state;

cause an interrupt descriptor structure address of the second interrupt descriptor structure to point to an interrupt descriptor structure address of the first interrupt descriptor structure, so that the first virtual machine inherits interrupt descriptor information of the virtual machine to be upgraded; and run the first virtual machine, based on a task process in the virtual machine to be upgraded, to implement hot upgrade of the virtual machine to be upgraded.

9. A non-transitory computer-readable storage medium, wherein a computer program is stored on the computer-readable storage medium, and when the computer program is run by a processor cause the processor to:

create, in a same host as a virtual machine to be upgraded, a first virtual machine for a virtual machine to be upgraded;

separately switch a first interrupt descriptor structure of the virtual machine to be upgraded and a second interrupt descriptor structure of the first virtual machine from a kernel state to a user state;

cause an interrupt descriptor structure address of the second interrupt descriptor structure to point to an interrupt descriptor structure address of the first interrupt descriptor structure, so that the first virtual machine inherits interrupt descriptor information of the virtual machine to be upgraded; and run the first virtual machine, based on a task process in the virtual machine to be upgraded, to implement hot upgrade of the virtual machine to be upgraded.

10. The electronic device of claim 8, wherein after the processor being caused to create the first virtual machine for the virtual machine to be upgraded, the processor is further caused to:

configure the interrupt descriptor structure address for the created second interrupt descriptor structure of the first virtual machine based on a memory page requested from a memory pool.

11. The electronic device of claim 8, wherein the processor being caused to cause the interrupt descriptor structure address of the second interrupt descriptor structure to point to the interrupt descriptor structure address of the first interrupt descriptor structure includes being caused to:

use the interrupt descriptor structure address of the first interrupt descriptor structure to replace the interrupt descriptor structure address of the second interrupt descriptor structure, so that the first virtual machine inherits the interrupt descriptor information of the virtual machine to be upgraded.

12. The electronic device of claim 8, wherein after the processor being caused to cause the interrupt descriptor structure address of the second interrupt descriptor structure to point to the interrupt descriptor structure address of the first interrupt descriptor structure, the processor is further caused to:

initialize the first virtual machine; and retain contents in the second interrupt descriptor structure during a process of initializing the first virtual machine.

13. The electronic device of claim 12, wherein the processor is further caused to:

prohibit updating an interrupt remapping table entry of the first virtual machine during the process of initializing the first virtual machine.

14. The electronic device of claim 12, wherein the processor is further caused to:

retain an interrupt request data in the interrupt descriptor structure of the first virtual machine during the process of initializing the first virtual machine.

15. The electronic device of claim 8, wherein the processor being caused to run the first virtual machine based on a task process in the virtual machine to be upgraded to implement hot upgrade of the virtual machine to be upgraded includes being caused to:

call, through a fork function and an execution function, the task process in the virtual machine to be upgraded to the first virtual machine that is started for execution, so as to start the first virtual machine to implement hot upgrade of the virtual machine to be upgraded.

16. The non-transitory computer-readable storage medium of claim 9, wherein after the processor being caused to create the first virtual machine for the virtual machine to be upgraded, the processor is further caused to:

configure the interrupt descriptor structure address for the created second interrupt descriptor structure of the first virtual machine based on a memory page requested from a memory pool.

17. The non-transitory computer-readable storage medium of claim 9, wherein the processor being caused to cause the interrupt descriptor structure address of the second interrupt descriptor structure to point to the interrupt descriptor structure address of the first interrupt descriptor structure includes being caused to:

use the interrupt descriptor structure address of the first interrupt descriptor structure to replace the interrupt descriptor structure address of the second interrupt descriptor structure, so that the first virtual machine inherits the interrupt descriptor information of the virtual machine to be upgraded.

18. The non-transitory computer-readable storage medium of claim 9, wherein after the processor being caused to cause the interrupt descriptor structure address of the second interrupt descriptor structure to point to the interrupt descriptor structure address of the first interrupt descriptor structure, the processor is further caused to:

initialize the first virtual machine; and retain contents in the second interrupt descriptor structure during a process of initializing the first virtual machine.

19. The non-transitory computer-readable storage medium of claim 18, wherein the processor is further caused to:

prohibit updating an interrupt remapping table entry of the first virtual machine during the process of initializing the first virtual machine.

20. The non-transitory computer-readable storage medium of claim 18, wherein the processor is further caused to:

retain an interrupt request data in the interrupt descriptor structure of the first virtual machine during the process of initializing the first virtual machine.

* * * * *